United States Patent
Wu et al.

(10) Patent No.: US 12,401,851 B1
(45) Date of Patent: Aug. 26, 2025

(54) COMPUTER-IMPLEMENTED METHODS FOR A TIME SYNCHRONIZED SWITCH ACROSS LIVE FEEDS AND CHANNELS

(71) Applicant: Amazon Technologies, Inc., Seattle, WA (US)

(72) Inventors: Yongjun Wu, Bellevue, WA (US); Woodrow John Arrington, Bothell, WA (US); Rohit Agarwal, Issaquah, WA (US); Kuldeep Sharma, Round Rock, TX (US); Henry Liu, Seattle, WA (US); Dwight Battle, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 40 days.

(21) Appl. No.: 17/847,876

(22) Filed: Jun. 23, 2022

(51) Int. Cl.
*H04N 21/218* (2011.01)
*H04N 21/2187* (2011.01)
*H04N 21/2343* (2011.01)
*H04N 21/262* (2011.01)
*H04N 21/266* (2011.01)
*H04N 21/432* (2011.01)
*H04N 21/458* (2011.01)
*H04N 21/472* (2011.01)

(52) U.S. Cl.
CPC ....... *H04N 21/458* (2013.01); *H04N 21/2187* (2013.01); *H04N 21/472* (2013.01)

(58) Field of Classification Search
None
See application file for complete search history.

(56) References Cited

U.S. PATENT DOCUMENTS

| | | | |
|---|---|---|---|
| 2003/0208771 A1* | 11/2003 | Hensgen | H04N 21/435 725/100 |
| 2006/0067580 A1* | 3/2006 | Lee | G11B 27/322 |
| 2009/0128631 A1* | 5/2009 | Ortiz | H04L 69/329 348/739 |
| 2012/0260334 A1* | 10/2012 | Nakai | G06F 21/629 726/20 |
| 2017/0324797 A1* | 11/2017 | Lee | H04L 65/612 |
| 2018/0199080 A1* | 7/2018 | Jackson, Jr. | H04N 21/2187 |
| 2018/0220166 A1* | 8/2018 | Meyer | H04N 21/222 |
| 2022/0329641 A1* | 10/2022 | Giladi | H04N 21/8456 |

* cited by examiner

*Primary Examiner* — Brian T Pendleton
*Assistant Examiner* — Jean D Saint Cyr
(74) *Attorney, Agent, or Firm* — NICHOLSON DE VOS WEBSTER & ELLIOTT LLP

(57) ABSTRACT

Techniques for a time synchronized switch across live feeds and channels in a media player application are described. According to some embodiments, a computer-implemented method includes displaying, on a client device, a first live stream of an event, that is still in progress, at a time-shifted time of the event relative to a known time of the event, receiving, from a user interface of the client device, a request to switch to a second live stream of the event, determining, by the client device, a time differential between the time-shifted time of the first live stream and the known time of the event, and displaying, on the client device, the second live stream beginning at a time that is time shifted by the time differential.

20 Claims, 12 Drawing Sheets

COMPUTER-IMPLEMENTED METHODS FOR A TIME SYNCHRONIZED SWITCH ACROSS LIVE FEEDS AND CHANNELS

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various embodiments in accordance with the present disclosure will be described with reference to the following drawings.

DETAILED DESCRIPTION

Figure 1:
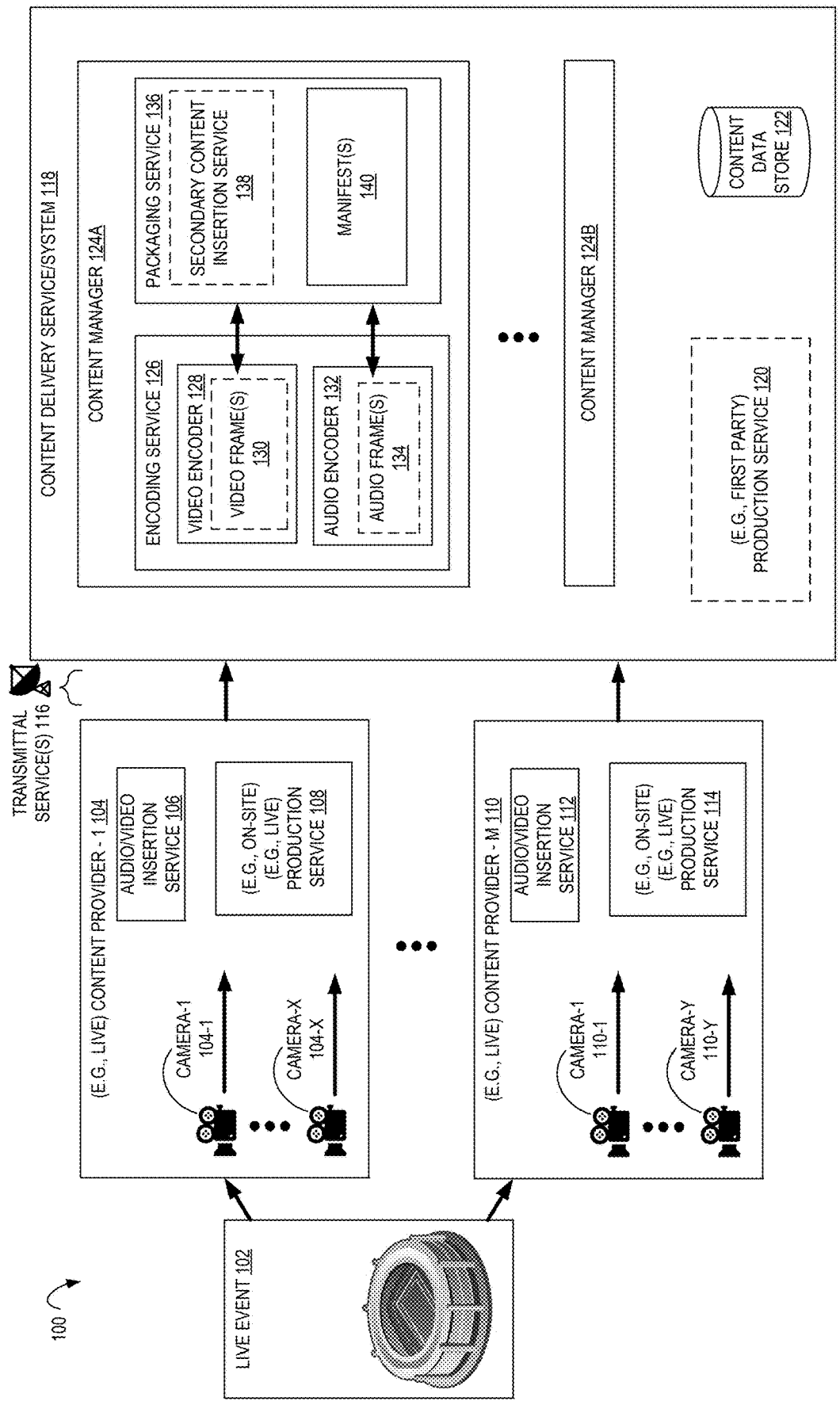
FIG. 1 is a diagram illustrating an environment including one or more content providers to capture a live event on a respective set of one or more cameras (e.g., and microphones) and transmit the video (e.g., live stream) (e.g., along with the corresponding audio) to a content delivery service/system having an encoding service according to some embodiments.

The present disclosure relates to methods, apparatus, systems, and non-transitory computer-readable storage media for a time synchronized switch across live feeds and channels. Certain embodiments herein are directed to a computer-implemented service and/or user device (e.g., client device) (e.g., non-transitory computer-readable medium stored on the device) to (e.g., approximately) synchronize the playback time location across different live feeds (e.g., live event items) when a user (e.g., customer of a media player and/or content provider) switches across them. Certain embodiments herein provide an end to end solution to synchronize switching between feeds (e.g., where the feeds have different content and/or different network latencies) (e.g., each feed using a different proper subset of cameras), for example, across different video streaming technologies (e.g., switching from a first feed according to a first video streaming standard to a second feed according to a second different streaming standard).

In certain embodiments, for a user (e.g., customer) changing feeds, if the user's media player (e.g., current position within the media being played) is at the live head of the current feed (e.g., live broadcast or live stream) when there is a request (e.g., from the user) to switch to a different feed, the media player is to begin playback of the different feed (e.g., live broadcast or live stream) at the live head of the different feed, for example, and there not being a (e.g., significant) difference in the event time (e.g., game time) during the change. However, in certain embodiments when not at the live head of the current feed and/or when the feeds themselves are not (e.g., perceptually) synchronized, a switch to a different feed causes the user to view a different portion of the feed, e.g., ahead of or behind what the user viewed immediately prior to the switch. This may cause the user to miss certain content or repeat certain content relative to the feeds. Embodiments herein overcome these issues by landing a user (e.g., customer of a media player and/or content provider) around the same event (e.g., game) time while switching between live feeds, for example, such that the content in the feeds as displayed is logically time synchronized (e.g., even when the live streams themselves are not actually time synchronized). In certain embodiments, these issues are overcome for (i) different live feeds having exactly the same video contents (e.g., from the same camera(s) but different audio content), (ii) partially different video content (e.g., from further editing in live production and/or with different audio content), and/or (iii) completely different video content (e.g., from different cameras and/or with different audio content). In certain embodiments, a media player according to this disclosure is to access time synchronization metadata (e.g., program date time (PDT)) and expose it for feed switching, e.g., in order to synchronize the feed (e.g., live stream) switch on the media player.

In certain embodiments, for a user (e.g., customer) changing feeds, if the user's media player (e.g., current position within the media being played) is time-shifted (e.g., not at the live head at the current feed (e.g., live broadcast or live stream)) when there is a request (e.g., from the user) to switch to a different feed, the media player is to begin playback of the different feed (e.g., live broadcast or live stream) at a time that is shifted by the difference between the time-shifted time of the current feed (e.g., live broadcast or live stream) and a known time (e.g., live time) of the event, e.g., instead of beginning playback at the live head of the different feed. In certain embodiments, this allows a user (e.g., customer of a content provider) to land in the different feed around the same time in the event that the user was viewing in the previous feed. In certain embodiments, this allows a user to land a certain shifted amount of time (e.g., depending on the duration of each video fragments in a streaming technology) behind (e.g., about 1 to 4 seconds behind) the same time in the event that the user was viewing in the previous feed.

In certain embodiments, the time synchronization metadata (e.g., PDT metadata) is delivered with the manifests and/or the video files (e.g., fragments or packets about video data, for example, a manifest and/or video file according to a streaming standard, e.g., a Transmission Control Protocol (TCP) and/or User Datagram Protocol (UDP) based streaming). In certain embodiments, the video streaming is according to a standard, e.g., a Dynamic Adaptive Streaming over HyperText Transfer Protocol (HTTP) (e.g., "MPEG-DASH" standard), an HTTP Live Streaming (HLS) standard, a Smooth Streaming standard, a UDP based standard, such as, but not limited to, video streaming from Sye® live streaming, or any other streaming protocols.

Embodiments herein improve the functioning of a computer-implemented method and a user (e.g., client) device by allowing a user to perceive a time synchronized switch across live feeds (e.g., live streams) without any action taken by the user to do so, for example, without manually adjusting a current location in the second stream (e.g., without manipulating a playback bar in the media player that keeps track of the current location in the duration of the stream).

FIG. 1 is a diagram illustrating an environment 100 including one or more content providers 104, 110 to capture a live event 102 on a respective set of one or more cameras (e.g., one or more of cameras 104-1 to 104-X, where X is any positive integer greater than one, and one or more of cameras 110-1 to 110-Y, where Y is any positive integer greater than one,) (e.g., and microphones) and transmit the video (e.g., live stream) (e.g., along with the corresponding audio) to a content delivery service/system 118 having an encoding service 126 according to some embodiments.

In certain embodiments, the live event 102 is a game of a sporting match, such as, but not limited to, each individual game of baseball, softball, football, soccer, basketball, hockey, etc. In certain embodiments, one or more (e.g., live) content providers (e.g., video production truck(s)) are on site to capture video (e.g., and audio) of the live event 102.

In certain embodiments, a (e.g., single) content provider 104 is on site to capture video (e.g., and audio) of the live event 102. In certain embodiments, content provider 104 includes (e.g., or has access to the video output of) one or more of cameras 104-1 to 104-X. In certain embodiments, content provider 104 includes an audio/video insertion service 106 (e.g., for inserting graphics, non-live video content, further audio (e.g., play-by-play or other commentary for the live event), etc.). In certain embodiments, content provider 104 includes a (e.g., on-site) (e.g., live) production service 108, e.g., to allow multi-camera video production such that the video from two or more cameras and or the audio from two or more audio sources are combined into a single output as a dynamic mix (e.g., by a director). In certain embodiments, content provider 104 is to encode the resulting output and send that encoded content to one or more downstream entities (e.g., content delivery service/system 118 and/or user(s)), for example, via (e.g., wired and/or wireless) transmittal services 116, e.g., via one or more networks.

In certain embodiments, one or more additional (e.g., M−1, where M is any positive integer greater than 1) content providers (e.g., content provider 110) are also on site to capture video (e.g., and audio) of the live event 102. In certain embodiments, content provider 110 includes an audio/video insertion service 112 (e.g., for inserting graphics, non-live video content, further audio (e.g., play-by-play or other commentary for the live event), etc.). In certain embodiments, content provider 110 includes (e.g., or has access to the video output of) one or more of cameras 110-1 to 110-Y. In certain embodiments, content provider 110 includes a (e.g., on-site) (e.g., live) production service 114, e.g., to allow multi-camera video production such that the video from two or more cameras and or the audio from two or more audio sources are combined into a single output as a dynamic mix (e.g., by a director). In certain embodiments, content provider 110 is to encode the resulting output and send that encoded content to one or more downstream entities (e.g., content delivery service/system 118 and/or user(s)), for example, via (e.g., wired and/or wireless) transmittal services 116, e.g., via one or more networks.

In certain embodiments when content providers are different (e.g., different entities, such (e.g., different live streamers or "television" networks), they may use different transmittal services 116, e.g., having different latencies (e.g., different network paths from each content provider to a same client device).

In certain embodiments, the content from content provider(s) 104, 110, etc. is sent to one or more content delivery services/systems (e.g., content delivery service/system 118).

The depicted content delivery service/system 118 includes a content data store 122, which may be implemented in one or more data centers. As one example, a media file (e.g., including a video file and audio file) (e.g., a media container) that is to be encoded is accessed from the content data store 122 by one or more content managers 124A-124B. In certain embodiments, the media file may be uploaded to content data store 122 by content provider(s) or provided directly (e.g., as live content) to one or more content managers 124A-124B by content provider(s) (e.g., from a live content encoder).

In certain embodiments, the content manager (e.g., described in reference to content manager 124A, but one or more other content managers may include one or more of the components discussed herein) controls the encoding (e.g., transcoding) of a media file into packages and files in various formats and in different sizes for distribution to end users (e.g., viewers). In certain embodiments, a user (e.g., separate from an end user or client) creates a job for a (e.g., uncompressed) multimedia file by specifying (e.g., via a console of or an application programming interface (API) call to the content manager) the information that the service will use to perform the encoding (e.g., transcoding) which may include, which multimedia file(s) to encode (e.g., transcode), which types of files to create and where to store them, which encoding settings to use, which advanced features to apply, etc. In certain embodiments, to set up a job, a user specifies the input files (e.g., from content data store 122) for the service to encode (e.g., transcode from one format to a different format), for example, by specifying the source for each video, audio, and/or captions media element. That source might be a specific part of a primary input file, or it might be a separate file. In certain embodiments, to set up a job, a user specifies the types of output files (e.g., and packages) that are to be generated from the input. In certain embodiments, to set up a job, a user specifies the encoding settings to produce the quality and type of output that is desired.

In certain embodiments, the encoding service 126 is to encode the media file (e.g., video file and corresponding audio file) into one or more sets of video and audio representations (e.g., streams). In FIG. 1, video encoder 128 is to receive an input of a video file and create video frame(s) 130 from that video file, e.g., for a video frame and/or fragment duration. In FIG. 1, audio encoder 132 is to receive an input of an audio file and create audio frame(s) 134 (e.g., a number of audio samples within each frame) for that audio file, e.g., at an audio frame and/or fragment duration. In certain embodiments, packaging service 136 is then to create one or more sets of multimedia (e.g., video and audio) representations (e.g., a media presentation), for example, a representation according to a standard (e.g., a MPEG-DASH standard, a HyperText Transfer Protocol (HTTP) Live Streaming (HLS) standard, a Smooth Streaming standard, or other standard). Encoding service 126 may include a plurality of instances of video encoder 128 and audio encoder 132, e.g., to process multiple inputs in parallel. In certain embodiments, secondary content insertion service 122 adds secondary content (e.g., advertisement(s)) into a main content. In certain embodiments, encoding service 110 is to encode both the main content and secondary content, e.g., and the secondary content insertion service 122 is to insert the secondary content into the main content.

Figure 2:
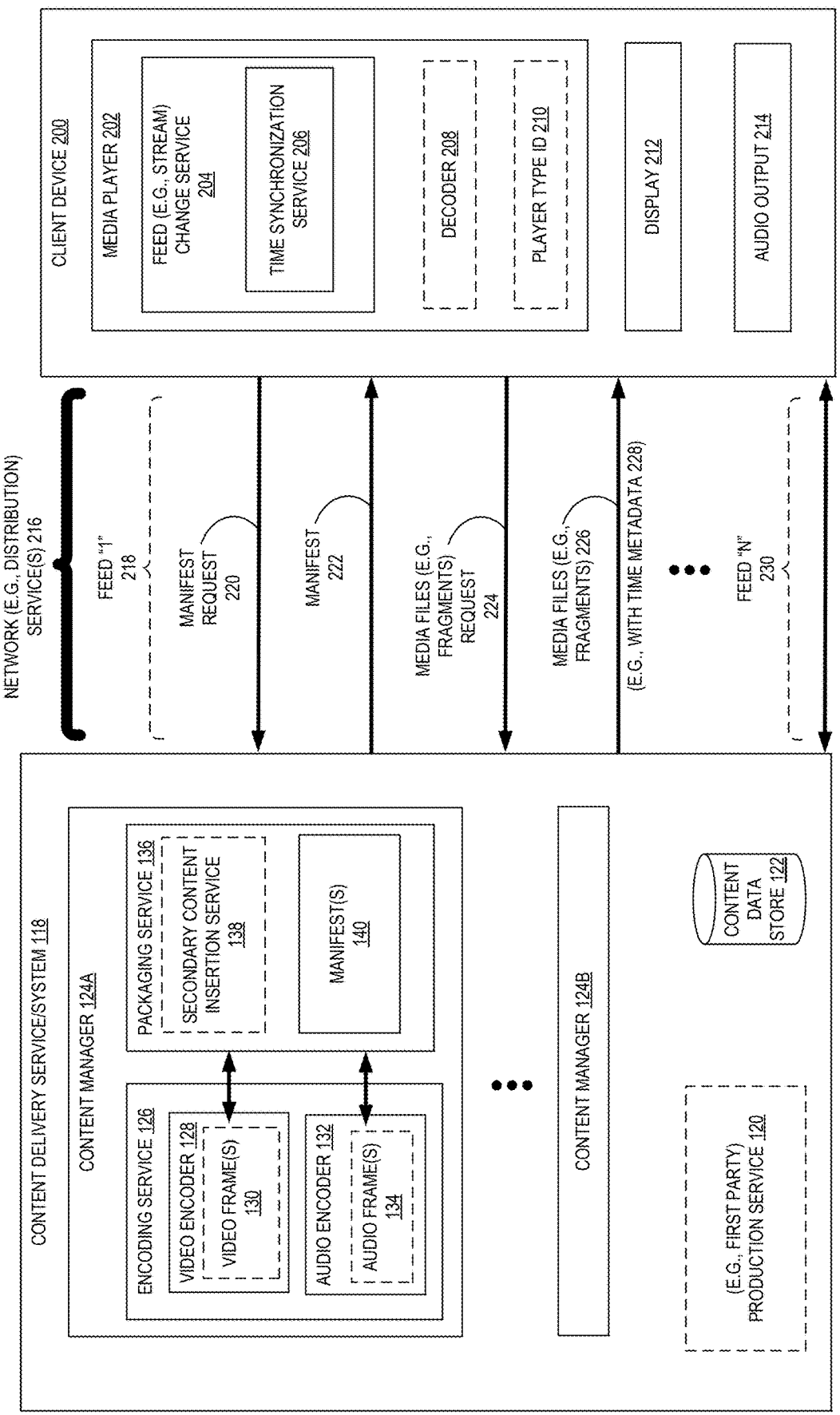
FIG. 2 is a diagram illustrating a content delivery service/system to send videos (e.g., live streams) to a client device according to some embodiments.

FIG. 2 is a diagram illustrating a content delivery service/system 118 to send videos (e.g., live streams) to a client device 200 according to some embodiments. In certain embodiments, client device 200 includes a media player 202 to play one or more feeds (e.g., live streams), for example, sent via network (e.g., distribution) services 216. In certain embodiments, media player 202 includes a decoder to decode a feed for viewing on display 212.

In certain embodiments, content delivery service/system 118 includes a (e.g., first party) production service 120, e.g., to allow multi-provider video production such that the video from two or more providers and or the audio from two or more audio providers are combined into a single output as a dynamic mix (e.g., by a director). In certain embodiments, content delivery service/system 118 is to encode the resulting output and send that encoded content to one or more downstream entities (e.g., one or more instances of client device 200), for example, via (e.g., wired and/or wireless) network services 216.

In certain embodiments, packaging service 136 includes one or more manifests 140, e.g., identifying the media file(s) (e.g., fragments, streams, etc.) to be output from content manager. In certain embodiments, a manifest for a particular media file (e.g., a particular title) identifies a proper subset of video and audio representations of the media file for a particular client device 200 (e.g., based on the client's media player 202 (e.g., determined from its type ID value 210), display 212 resolution, audio output 214 capabilities, and/or available bandwidth). In certain embodiments, the content is sourced from the content delivery service/system 118 in two parts: (i) the manifest 140 of all available media representations (e.g., their URL addresses and, optionally, other characteristics) and (ii) the media files (e.g., representations) (e.g., stream of fragments) in a single (e.g., container) or multiple files.

In certain embodiments, a client device 200 is to read (or store) a manifest 140 (e.g., sent in response to manifest request 138) before the client device may make a request for the media from that manifest, and thus access media files (e.g., audio fragments and corresponding video fragments) from media file content delivery service/system 118 (e.g., content data store 122), e.g., the URL for a live feed. In certain embodiments, to play feed 1 218, a client device 200 is to read manifest 222 (e.g., sent in response to manifest request 220) before the client device may make a request 224 for the media indicated by that manifest, and thus access media files 226 (e.g., audio fragments and corresponding video fragments, e.g., and time metadata 228) from media file content delivery service/system 118 (e.g., content data store 122), e.g., the URL for live feed 1.

Figure 3:
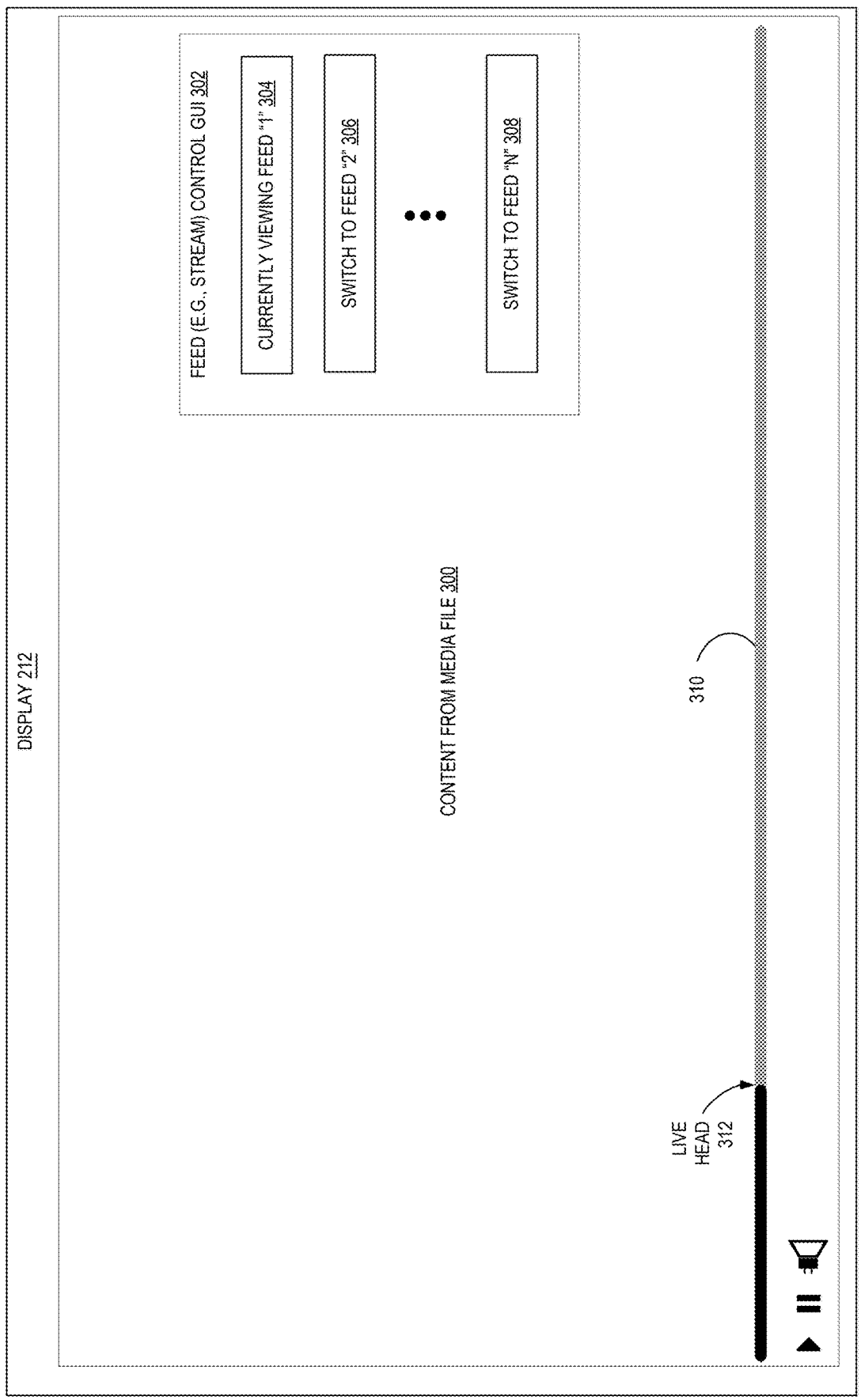
FIG. 3 is an example format of feed (e.g., live stream) control graphical user interface displayed on a display of a client device according to some embodiments.

In certain embodiments, a client device 200 is to switch between feeds, e.g., switch from a first feed 218 being currently displayed on display 212 to a second feed (e.g., feed "N" 230, where N is any positive integer greater than one), e.g., via a request from a user as discussed further in reference to FIG. 3. In certain embodiments, to play feed 2 230, a client device 200 is to read manifest (e.g., sent in response to manifest request) before the client device may make a request for the media indicated by that manifest, and thus access media files (e.g., audio fragments and corresponding video fragments, e.g., and time metadata) from media file content delivery service/system 118 (e.g., content data store 122), e.g., the URL for live feed 2.

However, in certain embodiments (e.g., as discussed below in reference to FIGS. 4-5), the different feeds may not be time synchronized, e.g., whether caused by the live feeds themselves being not synchronized and/or a client (e.g., user) having a time-shifted the current location (e.g., time) in the media player 202 for the currently viewed/displayed stream.

Embodiments herein allow, when the current location of the first feed being displayed by the media player 202 (e.g., current position within the first feed being played) is time-shifted (e.g., not at the live head at the current feed (e.g., live broadcast or live stream)) and there is a request (e.g., from the user) to switch to a different feed, the media player 202 is to begin playback of the different feed (e.g., live broadcast or live stream) at a time that is shifted by the difference between the time-shifted time of the current feed (e.g., live broadcast or live stream) and a known time (e.g., live time) of the event, e.g., instead of beginning playback at the live head of the different feed. In certain embodiments, this allows a client device 200 (e.g., media player 202) to land in the different feed around the same time in the event that the client device 200 (e.g., media player 202) was playing in the previous feed. In certain embodiments, this allows a client device 200 (e.g., media player 202) to land a certain shifted amount of time (e.g., depending on the duration of each video fragments in a streaming technology) behind (e.g., about 1 to 4 seconds behind) the same time in the event that the user was playing in the previous feed.

In certain embodiments, media player 202 includes a feed (e.g., stream) service 204 to switch between fees, e.g., to send corresponding requests and receive corresponding responses. In certain embodiments, media player 202 (e.g., feed change service 204 thereof) includes a time synchronization service 206 to perform one or more of the operations discussed herein, for example, to synchronize the playback time location across different live feeds, e.g., without any user action (e.g., other than indicated a feed change is desired).

In certain embodiments, the media player 202 (e.g., time synchronization service thereof) is to (e.g., in response to a request to switch streams) determine a time differential between the time-shifted time of the first live stream and the live time of the event (e.g., a time according to a time standard for the event, e.g., a time that the event started), and cause the displaying, on the media player, of the second live stream beginning at a time that is time shifted by the time differential (or shifted by the time differential plus a buffer time, with one non-limiting example of the buffer time being 1 to 4 seconds). In certain embodiments, the media player 202 (e.g., time synchronization service thereof) is to (e.g., in response to a request to switch streams) determine, by the client device, a time differential between the time-shifted time of the first live stream and a known time of the event, and cause the displaying, on the media player, of the second live stream beginning at a time that is time shifted by the time differential (or shifted by the time differential plus a buffer time, with one non-limiting example of the buffer time being 1 to 4 seconds).

In certain embodiments, the time is obtained from metadata in the feeds (e.g., streams). In certain embodiments, the relative time between the time metadata is known. In certain embodiments, the time metadata is program date time (PDT) metadata. In certain embodiments, the time is a time according to a time standard, e.g., International Atomic Time (TAI) standard, Coordinated Universal Time (UTC) standard, Global Positioning System (GPS) time standard, etc. In certain embodiments, the time is included (e.g., time "stamped) within a feed. In certain embodiments, the time is included in a manifest for a feed, e.g., with a time for each fragment or segment. In certain embodiments, the time metadata is output from a camera for a corresponding feed (e.g., frame(s)).

In certain embodiments, a request to change a current (e.g., live) feed is from a graphical user interface. FIG. 3 is an example format of feed (e.g., live stream) control graphical user interface (GUI) 302 displayed on a display 212 of a client device according to some embodiments. In certain embodiments, a display 212 is displaying content from a media file (e.g., a first feed), and a user (e.g., viewer) desires to change feeds. In certain embodiments, the user is to (e.g., after selecting a user interface element to cause GUI 302 to appear on the display 212) select another of feed for element 306, feed for element 308, etc. (e.g., and the GUI interface element for the "currently viewing" feed 304 indicating that), for example, selecting user interface element 306 to switch the displayed content from feed 1 to feed 2 or selecting user interface element 306 to switch the displayed content from feed 1 to feed "N" (e.g., where N is any positive integer greater than 2). In certain embodiments, the user interface element(s) 304, 306, or 308 may be, but are not limited to, being a checkbox, button, dropdown menu, etc. In certain embodiments, one feed is a home team's broadcast (e.g., with their set of announcer(s)) and another feed is the away team's broadcast (e.g., with their different set of announcer(s)).

In FIG. 3, the display 212 further includes other GUI elements such as a play button, a pause button, a volume control button, a playback bar in 310 from the media player that keeps track of the current location in the duration of the stream, and a live head indication 312 (shown as a darker line whose rightmost end is the current location in the duration of the stream).

Figure 4:
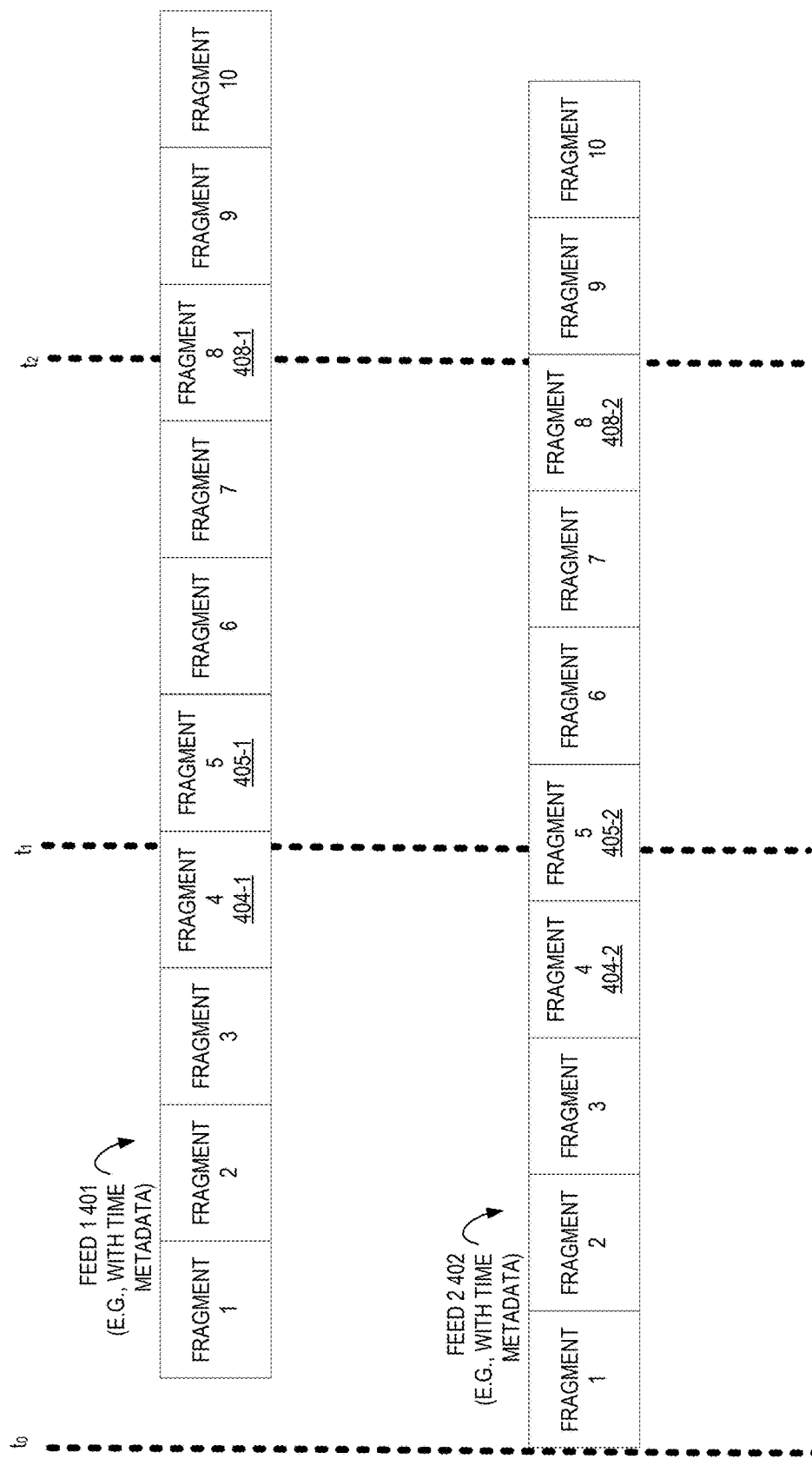
FIG. 4 is a diagram illustrating a second feed (e.g., live stream) that is ahead of a first feed (e.g., live stream) where the live-heads are synchronized according to some embodiments.

FIG. 4 is a diagram illustrating a second feed 402 (e.g., live stream) (e.g., with time metadata) that is ahead (e.g., as received at the media player to display the feed) of a first feed (e.g., live stream) according to some embodiments. Although ten fragments are shown, it should be understood that a video (e.g., title) may be formed from more or less than ten fragments, e.g., where each fragment is a plurality of frames. In certain embodiments, a media player according to this disclosure herein is to, when displaying first feed 401 that has a live head of time "$t_2$" (indicated by the dotted vertical line) and the current location being displayed is at time "$t_1$", for a request to switch to the second feed 402, is to determine (e.g., based on time metadata) the time "$t_1$" relative to a known time (e.g., the known time for currently displayed fragment 404-1, next to be displayed fragment 405-1 from first feed 401, or fragment 408-1 at the live head), and then locate that corresponding time in the second feed 402 to begin the display (e.g., and download) of the second feed 402 from that same time "$t_1$" (or that time "$t_1$" plus a buffer time, with one non-limiting example of the buffer time being 1 to 4 seconds). In certain embodiments, the fragment in feed two 402 including the time "$t_1$" is fragment 405-2, but those embodiments where a buffer time is desired, certain embodiments herein are to display (e.g., and download) the fragments for that buffer time (e.g., or one or more fragments immediately prior to fragment 405-2). In certain embodiments (e.g., caused by the feeds having different latencies to be delivered to the media player that the switching is occurring at), the fragment that includes time "$t_1$" in the first feed is different than the fragment that includes time "$t_1$" in the second feed.

In certain embodiments, if a user has changed the current location of the first feed (e.g., stream) 401 being displayed to time "$t_1$" (e.g., instead of at live head at time "$t_2$"), certain embodiments herein of a media player is to shift the display of feed (e.g., stream) two 402 to time "$t_1$" (or a time about "$t_1$" but before or after time "$t_1$"), e.g., instead of merely starting to play feed (e.g., stream) two 402 at the live head of time "$t_2$". In certain embodiments, the first feed (e.g., stream) 401 is time-offset from the live head of time "$t_2$" because the user has (i) manually selected time "$t_1$" to be displayed, e.g., "rewind", and/or (ii) paused the first feed 401 for a duration of "$t_2$" minus "$t_1$".

Figure 5:
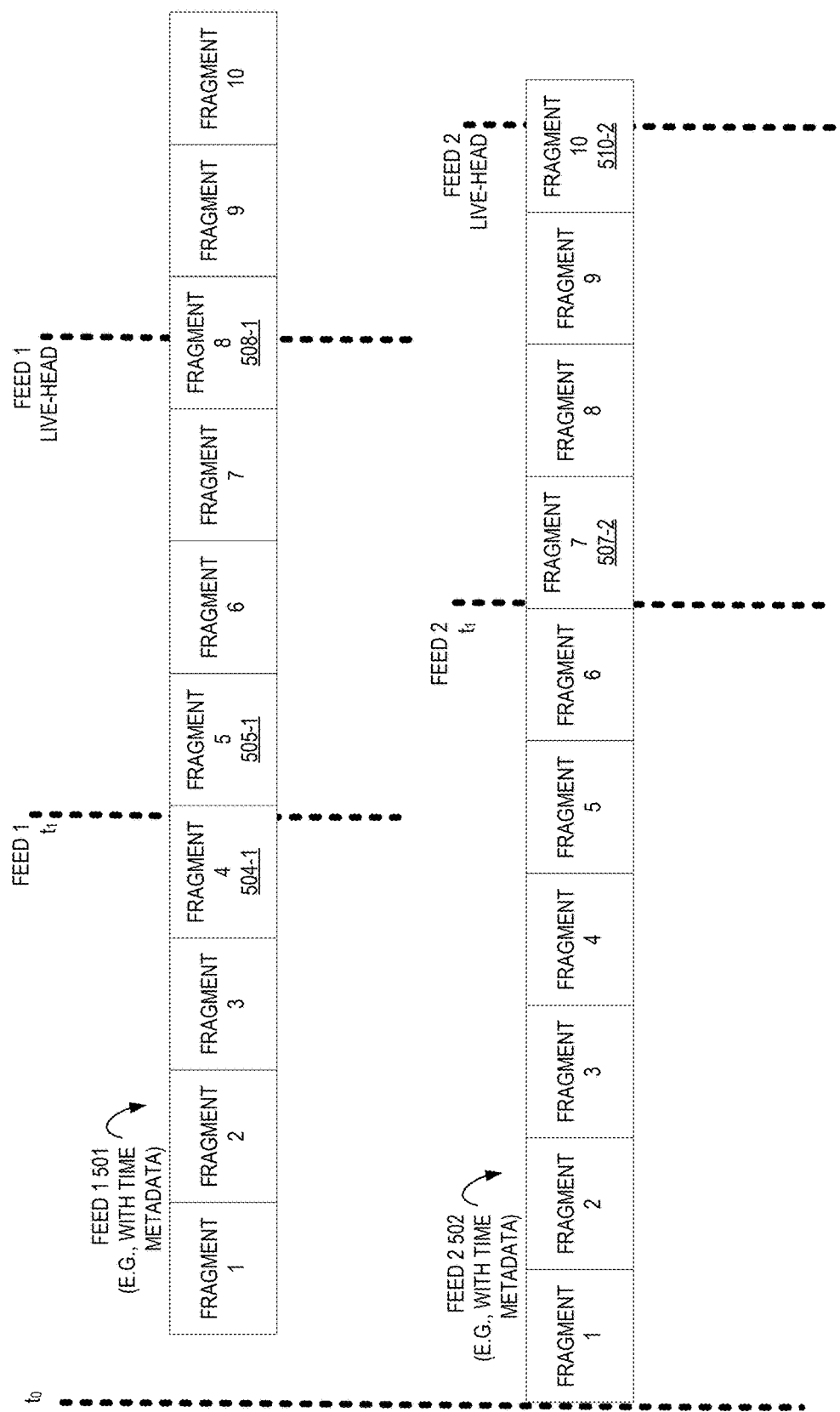
FIG. 5 is a diagram illustrating a second feed (e.g., live stream) that is ahead of a first feed (e.g., live stream) where the live-heads are not synchronized according to some embodiments.

FIG. 5 is a diagram illustrating a second feed 502 (e.g., live stream) that is ahead of a first feed (e.g., live stream) where the live-heads are not synchronized according to some embodiments.

In certain embodiments, the live-heads at "$t_2$" are not synchronized, e.g., caused by the streams having different latencies in their delivery to that media player, and a media player is to determine the difference in those feeds to synchronize a shift. In certain embodiments, the live head of the first stream 501 is time-offset from the live head of the second stream 502, and thus the media player performing the switch is to synchronize a shift from one stream to the other, e.g., for a logically time synchronized switch even though the live streams themselves are not actually time synchronized. Although ten fragments are shown, it should be understood that a video (e.g., title) may be formed from more or less than ten fragments, e.g., where each fragment is a plurality of frames. In certain embodiments, a media player according to this disclosure herein is to, when displaying first feed 501 that has a live head (indicated by the rightmost dotted vertical line) and the current location being displayed is at time "$t_1$", for a request to switch to the second feed 502, is to determine (e.g., based on time metadata) the feed one time "$t_1$" relative to a known time (e.g., the known time for currently displayed fragment 504-1, next to be displayed fragment 505-1 from first feed 501, or fragment 508-1 at the live head), and then locate that corresponding time in the second feed 502 to begin the display (e.g., and download) of the second feed 502 from that same time "$t_1$" (or that time "$t_1$" plus a buffer time, with one non-limiting example of the buffer time being 1 to 4 seconds). In certain embodiments, the fragment of the second feed 502 including the time "$t_1$" is fragment 507-2 (e.g., and fragment 510-2 includes the live-head of the second feed 502), but those embodiments where a buffer time is desired, certain embodiments herein are to display (e.g., and download) the fragments for that buffer time (e.g., or one or more fragments immediately prior to fragment 507-2). In certain embodiments (e.g., caused by the feeds having different latencies to be delivered to the media player that the switching is occurring at), the fragment that includes time "$t_1$" in the first feed is different than the fragment that includes time "$t_1$" in the second feed.

It should be noted that in certain embodiments, a second feed (e.g., live stream) is behind a first feed (e.g., live stream) according to some embodiments. In certain embodiments, when switching between a feed that is behind a second feed, the requested (e.g., not live-head) time in the second feed may not be ready yet (e.g., not be received and/or decoded by the media player yet). In such embodiments, the media player may present an indication indicating a wait.

Figure 6:
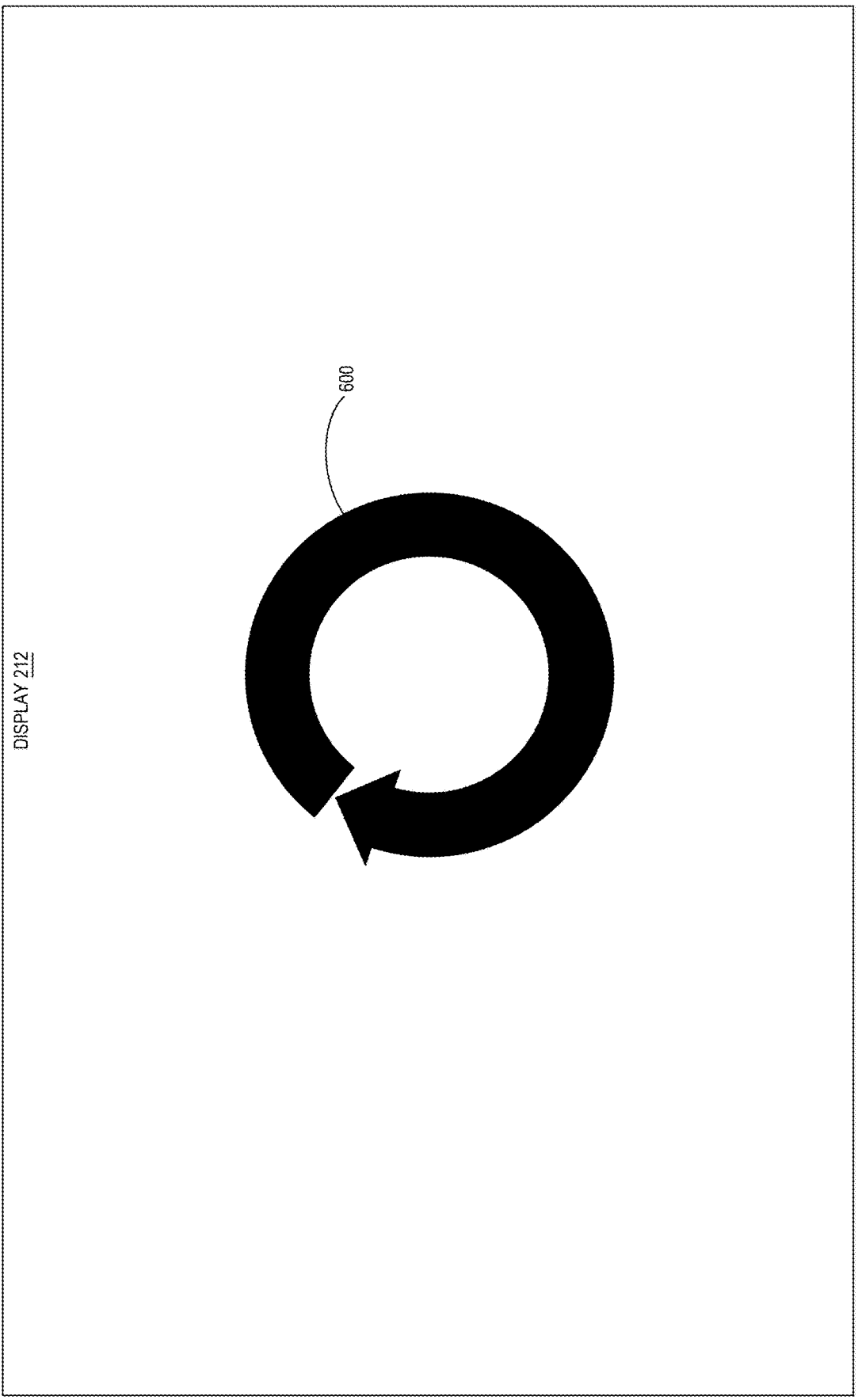
FIG. 6 is an example waiting (e.g., loading) indication (e.g., "spinner") being displayed on a display of a client device according to some embodiments.

FIG. 6 is an example waiting (e.g., loading) indication 600 (e.g., "spinner") being displayed on a display of a client device according to some embodiments. In certain embodiments, the waiting indication 600 is displayed while waiting for (e.g., new) content to be displayed (e.g., waiting for new content to be loaded, its licensed checked, and/or other operation delays).

Figure 7:
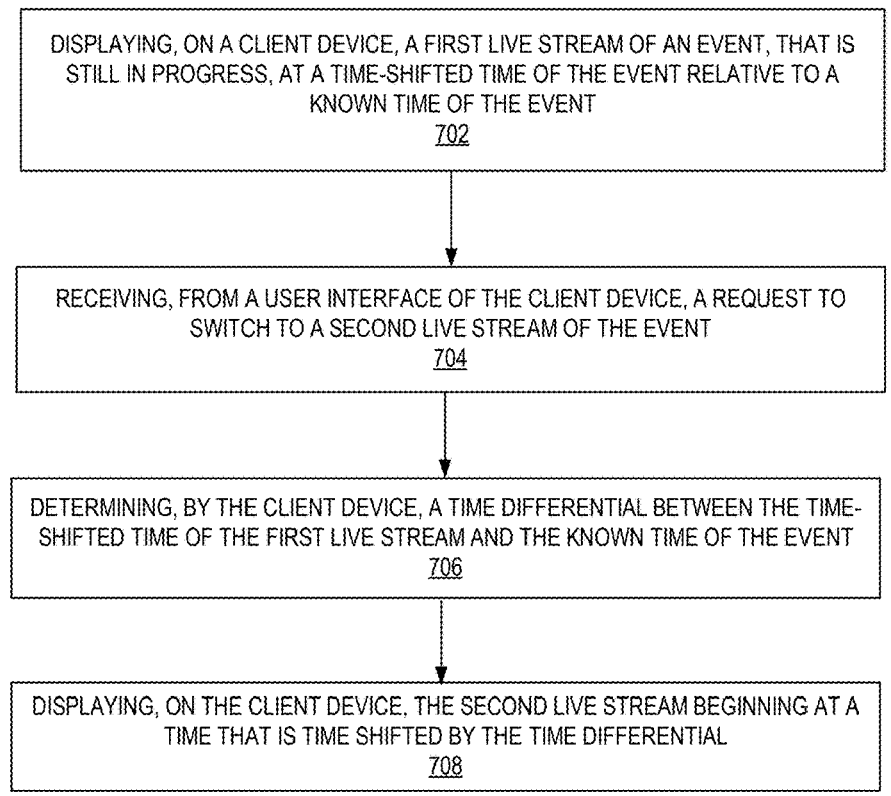
FIG. 7 is a flow diagram illustrating operations of a method of a time synchronized switch from a first live feed to a second live feed according to some embodiments.

FIG. 7 is a flow diagram illustrating operations 700 of a method of a time synchronized switch from a first live feed to a second live feed according to some embodiments. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 700 are performed by a client device (e.g., client device 200 or device 1100), for example, along with content delivery system 118 (e.g., implemented in a provider network) of the other figures.

The operations 700 include, at block 702, displaying, on a client device, a first live stream of an event, that is still in progress, at a time-shifted (e.g., and not live) time of the event relative to a known (e.g., PDT) time of the event. The operations 700 further include, at block 704, receiving, from a user interface of the client device, a request to switch to a second live stream of the event. The operations 700 further include, at block 706, determining, by the client device, a time differential between the time-shifted time of the first live stream and the known time of the event. The operations 700 further include, at block 708, displaying, on the client device, the second live stream beginning at a time that is time shifted by the time differential.

In certain embodiments, when in a first mode, a media player is to perform one or more of the time synchronization operations discussed herein, e.g., and when in a second mode, the media player is instead, when changing feeds from a first feed that is at a live-head, is to jump to the live-head (e.g., live play head) of the newly selected stream (e.g., along with displaying a warning before doing so that states "Switching feeds will jump you to live. Continue?", assuming the user selects Continue). In certain embodiments, the user is shown the warning message about jumping to live only if the media player is playing the first feed at a time-shifted time (e.g., not live), e.g., if already at live-head, the user is not shown the warning.

Live Production

Certain embodiments herein are directed to live feeds with Multiple Track Audio (MTA), e.g., having video content from the same camera(s) but different audio contents in MTA. Certain embodiments herein are directed to live feeds with completely different video content from different cameras with different audio contents, e.g., for live sports. In certain embodiments, the video content among different live feeds is captured and/or produced differently. In certain embodiments, live production ensures that the video contents in different live feeds are time synchronized (e.g., at frame accuracy) (e.g., from a time according to a time standard). Thus, in certain embodiments, the venue time in the video content in different live feeds will be exactly the same game time. In other embodiments, the feeds are not synchronized to the venue time, but the embodiments herein allow for synchronization on the media player side.

Media Player Access to Time Synchronization Metadata

In certain embodiments, a media player allows a user (e.g., customer) to jump to the time location of a highlight in a video (e.g., movie), for example, where the time location of a highlight is identified in a separately encoded stream (e.g., through the venue time, such as, but not limited to, Program Date Time (PDT), which is the same and synchronized across all different encodes and could identify the same event content). Embodiments herein retrieve the venue time, for example, PDT, when switching from one live event stream to another live even stream (e.g., with some rounding down towards the event starting time, in order to optimize the time to first frame (TTFF) on the switch and not miss any interesting moment(s) for customers). The rounding could be the fragment/group of pictures (GOP) duration in the specific streaming technology, e.g., a first rounding down (e.g., 1 second) for Sye®, a second rounding down (e.g., 2 seconds) for DASH, a third rounding down (e.g., 4 seconds) in HLS, or a same rounding down (e.g., 4 seconds) everywhere, e.g., whichever is more convenient.

Exemplary environments, systems, etc. that the above may be used in are detailed below.

At least some embodiments of the disclosed technologies can be described in view of the following examples:

Example 1. A computer-implemented method comprising:
displaying, on a client device, a first live stream of an event, that is still in progress, at a time-shifted time of the event relative to a live time of the event;
receiving, from a user interface of the client device, a request to switch to a second live stream of the event;
determining, by the client device, a time differential between the time-shifted time of the first live stream and the live time of the event; and
displaying, on the client device, the second live stream beginning at a time that is time shifted by the time differential.

Example 2. The computer-implemented method of example 1, further comprising:
reading, by the client device based at least in part on the request to switch, program date time (PDT) metadata of the first live stream; and
determining, by the client device, the live time of the event based on the PDT metadata.

Example 3. The computer-implemented method of example 1, wherein the first live stream is from a different camera than the second live stream.

Example 4. A computer-implemented method comprising:
displaying, on a client device, a first live stream of an event, that is still in progress, at a time-shifted (e.g., not live) time of the event relative to a known time of the event;
receiving, from a user interface of the client device, a request to switch to a second live stream of the event;
determining, by the client device, a time differential between the time-shifted time of the first live stream and the known time of the event; and
displaying, on the client device, the second live stream beginning at a time that is time shifted by the time differential.

Example 5. The computer-implemented method of example 4, further comprising:
reading, by the client device based at least in part on the request to switch, program date time (PDT) metadata of the first live stream; and
determining, by the client device, the known time of the event based on the PDT metadata.

Example 6. The computer-implemented method of example 5, wherein the reading comprises reading the PDT metadata from a manifest file of the first live stream that is separate from any fragment of the first live stream.

Example 7. The computer-implemented method of example 5, further comprising reading, by the client device based at least in part on the request to switch, program date time (PDT) metadata of the second live stream, wherein the displaying, on the client device, the second live stream beginning at the time that is time shifted by the time differential comprises shifting the time to begin the second live stream based at least in part on the PDT metadata of the second live stream.

Example 8. The computer-implemented method of example 4, wherein the first live stream is from a different camera than the second live stream.

Example 9. The computer-implemented method of example 4, wherein the first live stream and the second live stream have a same video content but different audio content.

Example 10. The computer-implemented method of example 4, wherein the first live stream and the second live stream have different video content.

Example 11. The computer-implemented method of example 10, wherein the different video content comprises one of the first live stream and the second live stream having further editing in live production than the other of the first live stream and the second live stream.

Example 12. The computer-implemented method of example 4, wherein the first live stream has a different network latency to the client device than the second live stream.

Example 13. The computer-implemented method of example 4, wherein the displaying, on the client device, the second live stream beginning at the time that is time shifted by the time differential comprises:
determining that an initial frame of the second live stream to be displayed is in a middle of a fragment; and
downloading all of the fragment based on the determining that the initial frame of the second live stream is in the middle of the fragment.

Example 14. The computer-implemented method of example 4, wherein the first live stream is according to a video streaming standard and the second live stream is according to a different video streaming standard.

Example 15. A non-transitory computer-readable medium storing code that, when executed by a device, causes the device to perform a method comprising:
displaying, on the device, a first live stream of an event, that is still in progress, at a time-shifted time of the event relative to a known time of the event;
receiving, from a user interface of the device, a request to switch to a second live stream of the event;
determining, by the device, a time differential between the time-shifted time of the first live stream and the known time of the event; and
displaying, on the device, the second live stream beginning at a time that is time shifted by the time differential.

Example 16. The non-transitory computer-readable medium of example 15, wherein the method further comprises:
reading, by the device based at least in part on the request to switch, program date time (PDT) metadata of the first live stream; and
determining, by the device, the known time of the event based on the PDT metadata.

Example 17. The non-transitory computer-readable medium of example 15, wherein the first live stream is from a different camera than the second live stream.

Example 18. The non-transitory computer-readable medium of example 15, wherein the first live stream and the second live stream have a same video content but different audio content.

Example 19. The non-transitory computer-readable medium of example 15, wherein the first live stream and the second live stream have different video content.

Example 20. The non-transitory computer-readable medium of example 15, wherein the first live stream has a different network latency to the device than the second live stream.

Figure 8:
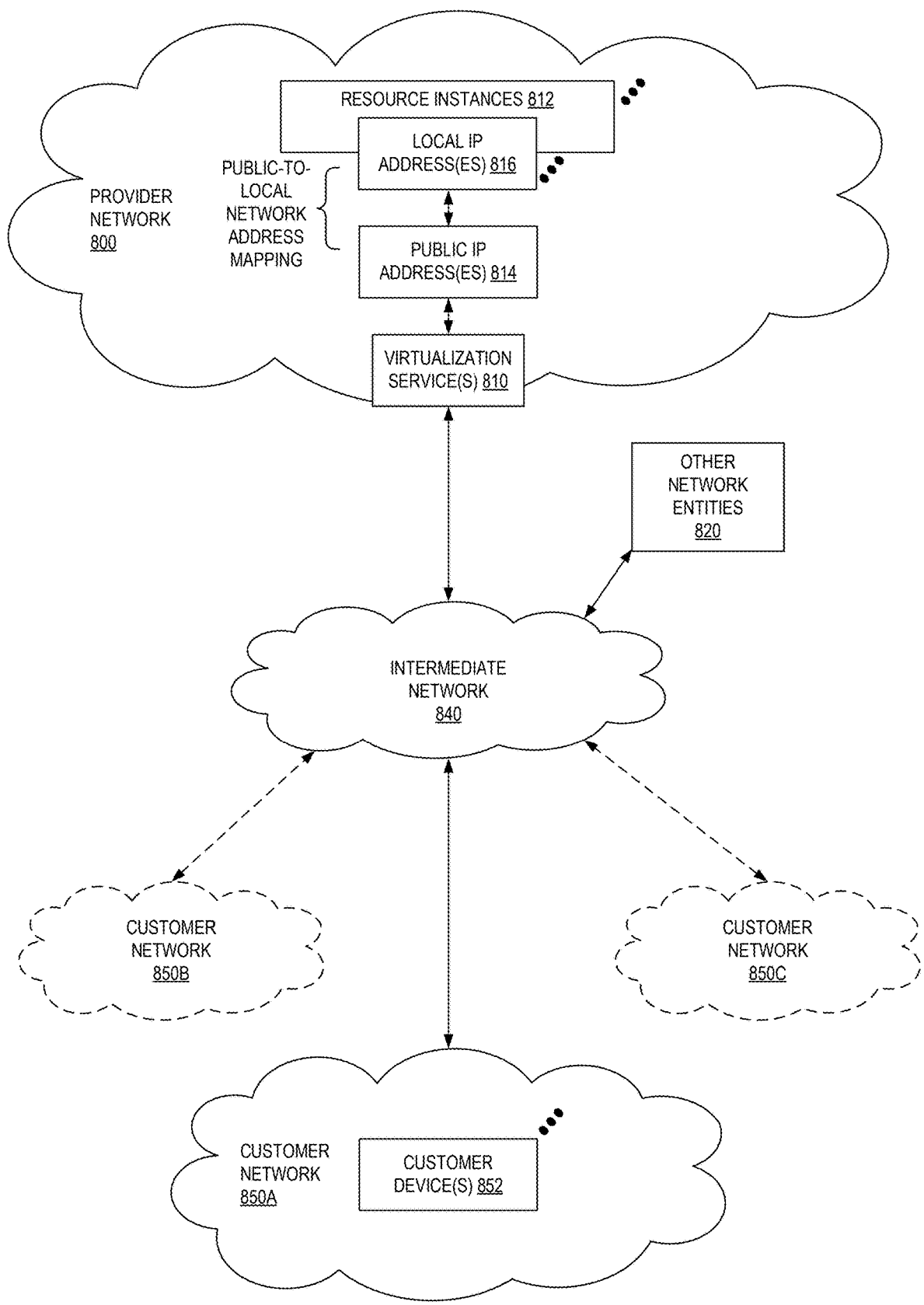
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
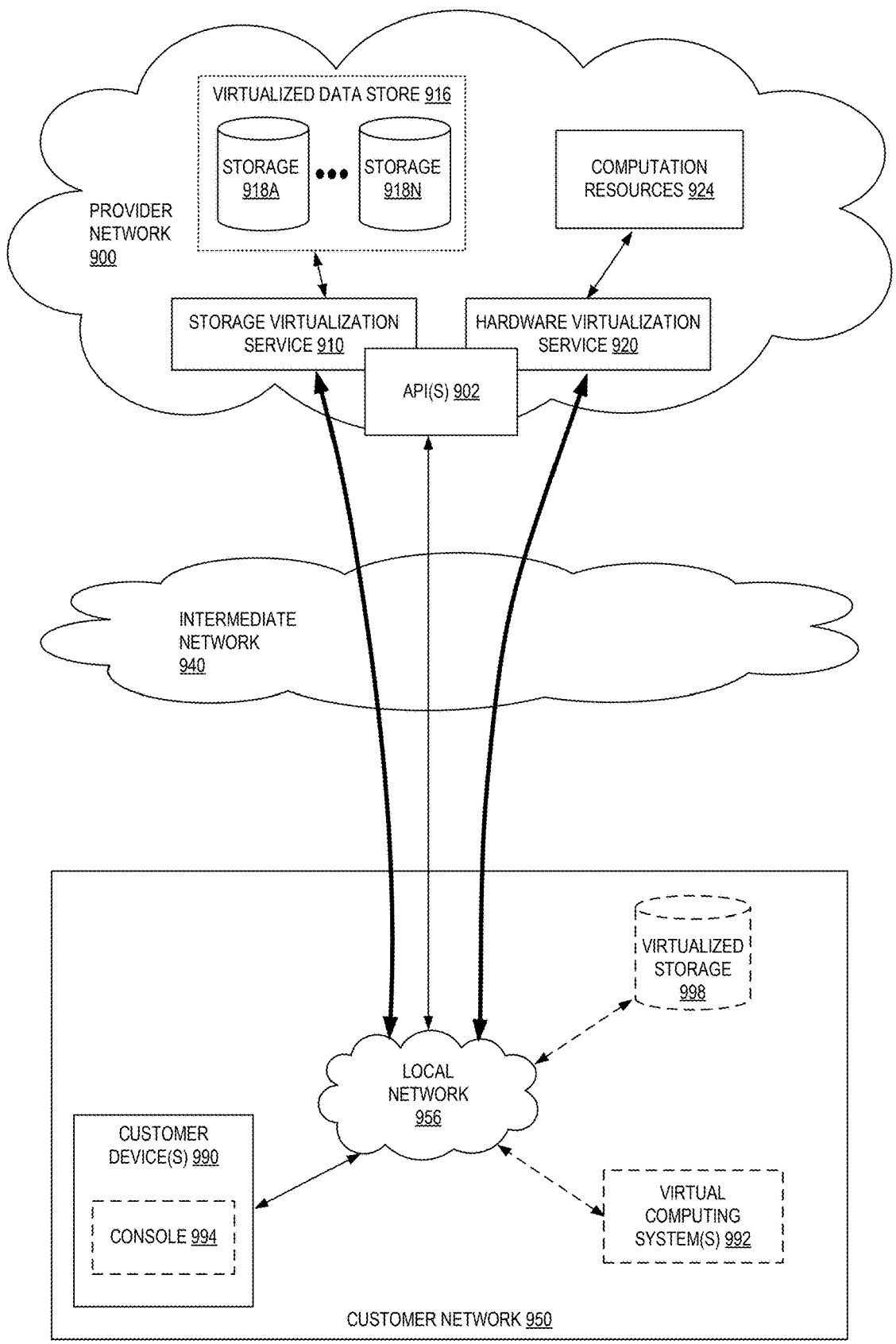
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative System

Figure 10:
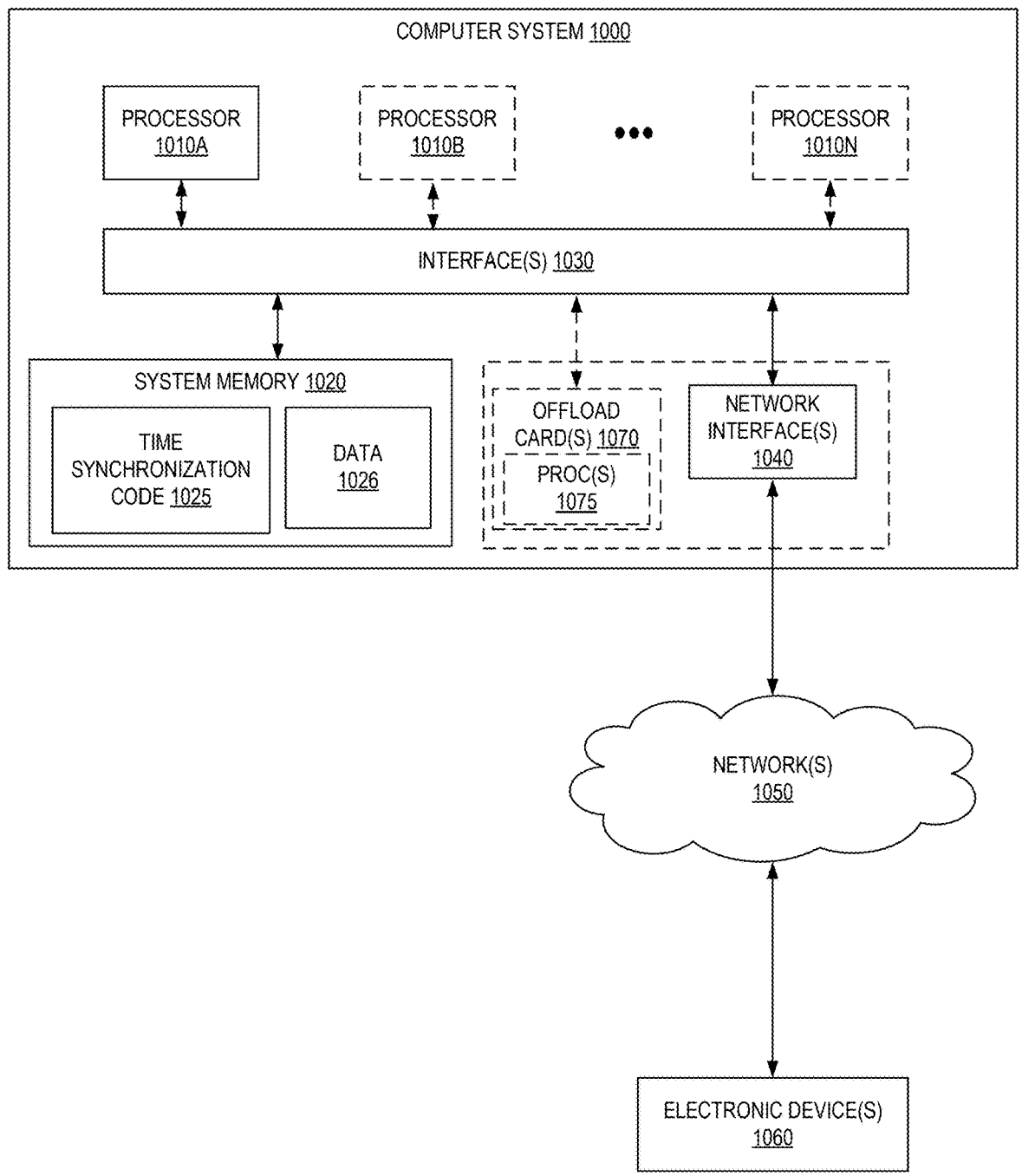
FIG. 10 is a block diagram illustrating an example computer system that may be used in some embodiments.

In some embodiments, a system that implements a portion or all of the techniques for content indexing as described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as time synchronization code 1025 (e.g., executable to implement, in whole or in part, the time synchronization service 206) and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing, or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Figure 11:
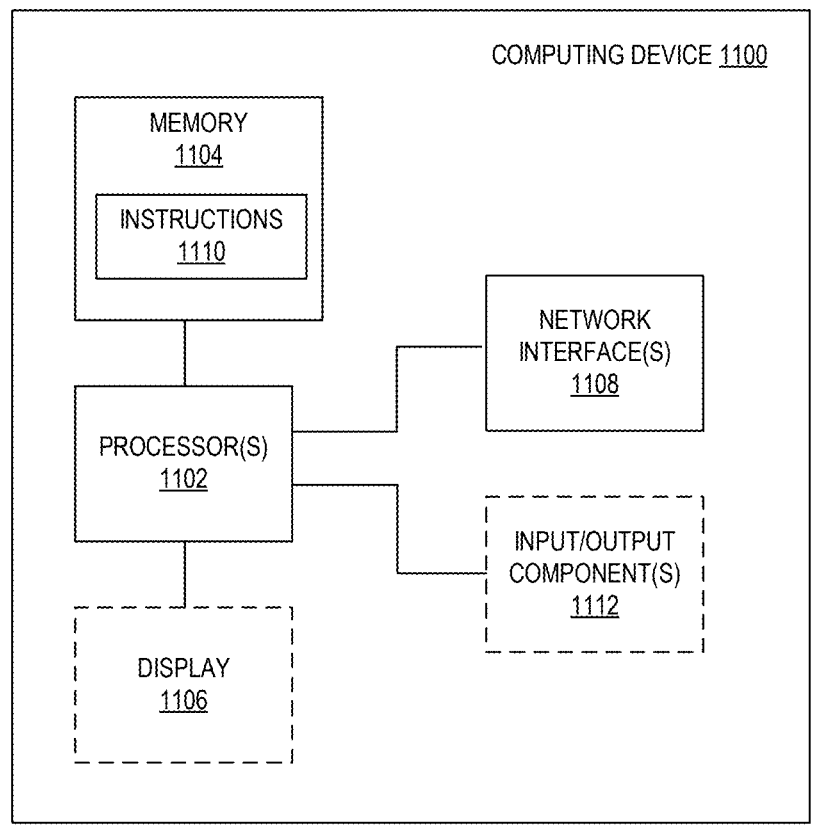
FIG. 11 illustrates a logical arrangement of a set of general components of an exemplary computing device that can be utilized in accordance with various embodiments.

FIG. 11 illustrates a logical arrangement of a set of general components of an example computing device 1100. Generally, a computing device 1100 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1102 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1104) to store code (for example, instructions 1110, e.g., which implement a content delivery service as disclosed herein), and a set of one or more wired or wireless network interfaces 1108 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1104) of a given electronic device typically stores code (e.g., instructions 1110) for execution on the set of one or more processors 1102 of that electronic device. One or more parts of various embodiments may be implemented using different combinations of software, firmware, and/or hardware.

A computing device 1100 can include some type of display element 1106, such as a touch screen or liquid crystal display (LCD), although many devices such as portable media players might convey information via other means, such as through audio speakers, and other types of devices such as server end stations may not have a display element 1106 at all. As discussed, some computing devices used in some embodiments include at least one input and/or output component(s) 1112 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 12:
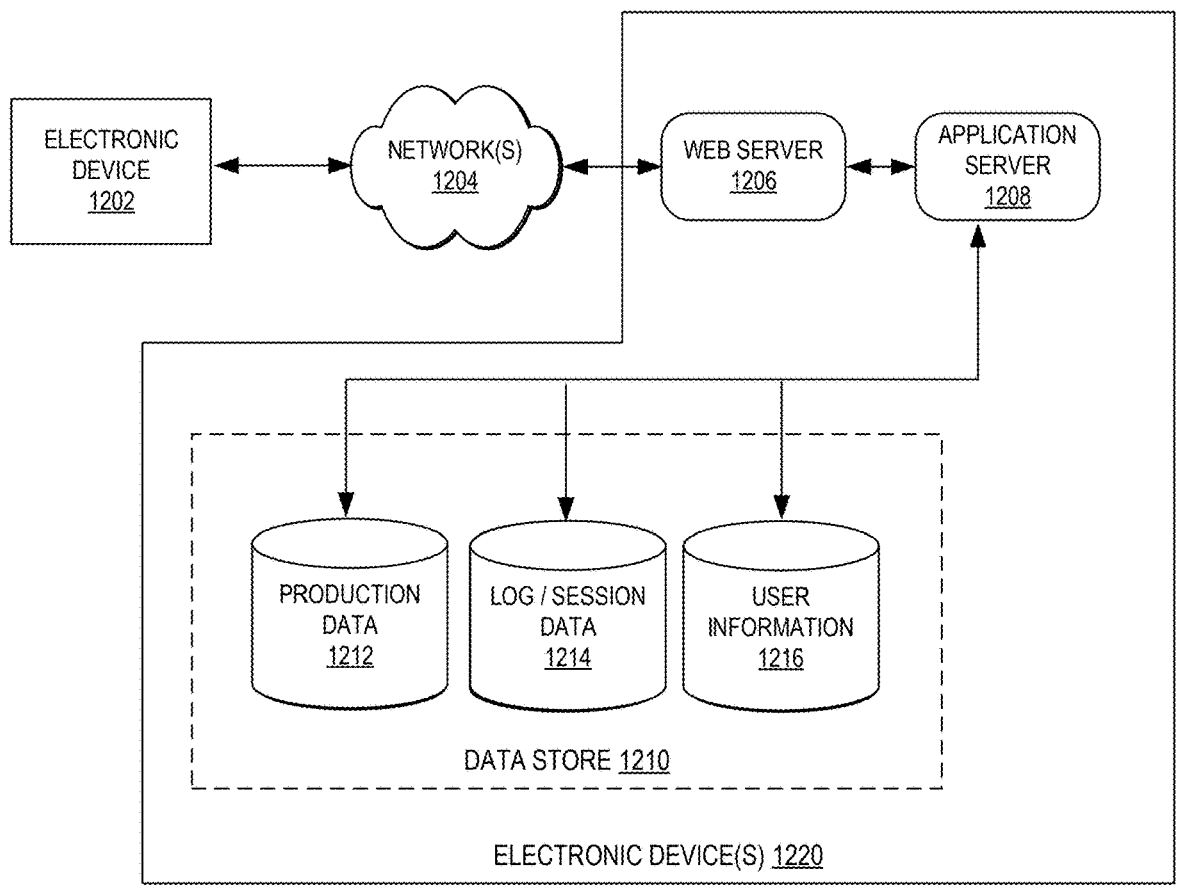
FIG. 12 illustrates an example of an environment for implementing aspects in accordance with various embodiments.

As discussed, different approaches can be implemented in various environments in accordance with the described embodiments. For example, FIG. 12 illustrates an example of an environment 1200 for implementing aspects in accordance with various embodiments. For example, in some embodiments messages are HyperText Transfer Protocol (HTTP) requests that are received by a web server (e.g., web server 1206), and the users, via electronic devices, may interact with the provider network via a web portal provided via the web server 1206 and application server 1208. As will be appreciated, although a web-based environment is used for purposes of explanation, different environments may be used, as appropriate, to implement various embodiments. The system includes an electronic client device 1202, which may also be referred to as a client device and can be any appropriate device operable to send and receive requests, messages, or information over an appropriate network 1204 and convey information back to a user of the device 1202. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1204 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1204 includes the Internet, as the environment includes a web server 1206 for receiving requests and serving content in response thereto, although for other networks an alternative device serving a similar purpose could be used, as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server 1208 can include any appropriate hardware and software for integrating with the data store 1210 as needed to execute aspects of one or more applications for the client device 1202 and handling a majority of the data access and business logic for an application. The application server 1208 provides access control services in cooperation with the data store 1210 and is able to generate content such as text, graphics, audio, video, etc., to be transferred to the client device 1202, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1202 and the application server 1208, can be handled by the web server 1206. It should be understood that the web server 1206 and application server 1208 are not required and are merely example components, as structured code discussed herein can be executed on any appropriate device or host machine as discussed elsewhere herein.

The data store 1210 can include several separate data tables, databases, or other data storage mechanisms and media for storing data relating to a particular aspect. For example, the data store illustrated includes mechanisms for storing production data 1212 and user information 1216, which can be used to serve content for the production side. The data store 1210 also is shown to include a mechanism for storing log or session data 1214. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update, or otherwise process data in response thereto. In one example, a user might submit a search request for a certain type of item. In this case, the data store 1210 might access the user information 1216 to verify the identity of the user and can access a production data 1212 to obtain information about items of that type. The information can then be returned to the user, such as in a listing of results on a web page that the user is able to view via a browser on the user device 1202. Information for a particular item of interest can be viewed in a dedicated page or window of the browser.

The web server 1206, application server 1208, and/or data store 1210 may be implemented by one or more electronic devices 1220, which can also be referred to as electronic server devices or server end stations, and may or may not be located in different geographic locations. Each of the one or more electronic devices 1220 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the environment 1200 in FIG. 12 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 918A-918N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    displaying, on a client device, a first live stream of an event from a first set of cameras of a first content provider, that is still in progress, at a time-shifted time of the event relative to a live time of the event;
    receiving, from a user interface of the client device, a request to switch to a second live stream of the event, of a second content provider, from a second set of cameras that is separate from the first set of cameras, wherein one of the first live stream and the second live stream includes further editing in live production than the other of the first live stream and the second live stream;
    determining, by the client device, a time differential to synchronize the switch from the first live stream to the second live stream based on the time-shifted time of the first live stream and the live time of the event and based on a time utilized for the further editing in live production; and
    displaying, on the client device, the second live stream beginning at a time that is time shifted by the time differential.

2. The computer-implemented method of claim 1, further comprising:
    reading, by the client device based at least in part on the request to switch, program date time (PDT) metadata of the first live stream; and
    determining, by the client device, the live time of the event based on the PDT metadata.

3. The computer-implemented method of claim 1, wherein the further editing in live production comprises a dynamic mixing of videos from multiple cameras by a production service on-site of the event.

4. A computer-implemented method comprising:
    displaying, on a client device, a first live stream of an event, that is still in progress, at a time-shifted time of the event relative to a known time of the event;
    receiving, from a user interface of the client device, a request to switch to a second live stream of the event, wherein one of the first live stream and the second live stream includes further editing in live production than the other of the first live stream and the second live stream;
    determining, by the client device, a time differential to synchronize the switch from the first live stream to the second live stream based on the time-shifted time of the first live stream and the known time of the event and based on a time utilized for the further editing in live production; and
    displaying, on the client device, the second live stream beginning at a time that is time shifted by the time differential.

5. The computer-implemented method of claim 4, further comprising:
    reading, by the client device based at least in part on the request to switch, program date time (PDT) metadata of the first live stream; and
    determining, by the client device, the known time of the event based on the PDT metadata.

6. The computer-implemented method of claim 5, wherein the reading comprises reading the PDT metadata from a manifest file of the first live stream that is separate from any fragment of the first live stream.

7. The computer-implemented method of claim 5, further comprising reading, by the client device based at least in part on the request to switch, program date time (PDT) metadata of the second live stream, wherein the displaying, on the client device, the second live stream beginning at the time that is time shifted by the time differential comprises shifting the time to begin the second live stream based at least in part on the PDT metadata of the second live stream.

8. The computer-implemented method of claim 4, wherein the first live stream is from a first content provider and the second live stream is from a second different content provider.

9. The computer-implemented method of claim 8, wherein the first live stream is generated by a first on-site production service at the event and the second live stream is generated by a second different on-site production service at the event.

10. The computer-implemented method of claim 4, further comprising checking a license of the second live stream, wherein the determining the time differential to synchronize the switch from the first live stream to the second live stream is further based on a time utilized for the checking the license of the second live stream.

11. The computer-implemented method of claim 4, wherein the further editing in live production comprises a dynamic mixing of videos from multiple cameras by a production service on-site of the event.

12. The computer-implemented method of claim 4, wherein the first live stream has a different network latency to the client device than the second live stream to the client device, and the determining the time differential to synchronize the switch from the first live stream to the second live stream is further based on the different network latency.

13. The computer-implemented method of claim 4, wherein the displaying, on the client device, the second live stream beginning at the time that is time shifted by the time differential comprises:
 determining that an initial frame of the second live stream to be displayed is in a middle of a fragment; and
 downloading all of the fragment based on the determining that the initial frame of the second live stream is in the middle of the fragment.

14. The computer-implemented method of claim 13, wherein the first live stream is according to a video streaming standard and the second live stream is according to a different video streaming standard.

15. A non-transitory computer-readable medium storing code that, when executed by a device, causes the device to perform a method comprising:
 displaying, on the device, a first live stream of an event, that is still in progress, at a time-shifted time of the event relative to a known time of the event;
 receiving, from a user interface of the device, a request to switch to a second live stream of the event, wherein one of the first live stream and the second live stream includes further editing in live production than the other of the first live stream and the second live stream;
 determining, by the device, a time differential to synchronize the switch from the first live stream to the second live stream based on the time-shifted time of the first live stream and the known time of the event and based on a time utilized for the further editing in live production; and
 displaying, on the device, the second live stream beginning at a time that is time shifted by the time differential.

16. The non-transitory computer-readable medium of claim 15, wherein the method further comprises:
 reading, by the device based at least in part on the request to switch, program date time (PDT) metadata of the first live stream; and
 determining, by the device, the known time of the event based on the PDT metadata.

17. The non-transitory computer-readable medium of claim 15, wherein the further editing in live production comprises a dynamic mixing of videos from multiple cameras by a production service on-site of the event.

18. The non-transitory computer-readable medium of claim 15, wherein the first live stream is from a first content provider and the second live stream is from a second different content provider.

19. The non-transitory computer-readable medium of claim 15, wherein the method further comprises checking a license of the second live stream, and the determining the time differential to synchronize the switch from the first live stream to the second live stream is further based on a time utilized for the checking the license of the second live stream.

20. The non-transitory computer-readable medium of claim 15, wherein the first live stream has a different network latency to the device than the second live stream to the device, and the determining the time differential to synchronize the switch from the first live stream to the second live stream is further based on the different network latency.

* * * * *